United States Patent
Lu et al.

(10) Patent No.: US 7,539,279 B2
(45) Date of Patent: May 26, 2009

(54) LOGARITHMIC SPECTRUM TRANSMITTER WAVEFORM FOR CONTROLLED-SOURCE ELECTROMAGNETIC SURVEYING

(75) Inventors: Xinyou Lu, Missouri City, TX (US); Leonard J. Srnka, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 248 days.

(21) Appl. No.: 11/587,420

(22) PCT Filed: Apr. 20, 2005

(86) PCT No.: PCT/US2005/013250

§ 371 (c)(1),
(2), (4) Date: Oct. 25, 2006

(87) PCT Pub. No.: WO2005/117326

PCT Pub. Date: Dec. 8, 2005

(65) Prior Publication Data

US 2007/0177705 A1    Aug. 2, 2007

Related U.S. Application Data

(60) Provisional application No. 60/572,694, filed on May 20, 2004.

(51) Int. Cl.
*H04L 23/00* (2006.01)
(52) U.S. Cl. ............. 375/377; 375/239; 181/101; 181/106; 181/118; 340/853.1; 340/854.6; 324/323
(58) Field of Classification Search ... 340/853.1–853.2, 340/854.6; 181/101–122; 324/360–362, 324/323; 375/239, 377
See application file for complete search history.

(56) References Cited

U.S. PATENT DOCUMENTS

| | | | |
|---|---|---|---|
| 4,780,859 A | 10/1988 | Hadidi et al. | 367/43 |
| 4,965,582 A | 10/1990 | Hellsten | 342/25 |
| 5,357,253 A | 10/1994 | Van Etten et al. | 342/22 |
| 5,406,530 A | 4/1995 | Yamamoto | 367/57 |
| 5,955,884 A | 9/1999 | Payton et al. | 324/339 |
| 6,326,793 B1 | 12/2001 | Moore | 324/615 |
| 6,477,113 B2 | 11/2002 | Hornbostel et al. | 367/38 |
| 6,495,016 B1 | 12/2002 | Nawracala | 204/604 |
| 6,501,271 B1 | 12/2002 | Lenssen et al. | 324/252 |
| 6,541,975 B2 | 4/2003 | Strack | 324/323 |
| 6,664,788 B2 | 12/2003 | Hornbostel et al. | 324/323 |
| 6,670,813 B2 | 12/2003 | Strack | 324/323 |

(Continued)

OTHER PUBLICATIONS

Aittoniemi, K. et al. (1987) "Interactive Inversion Algorithm and Apparent Resistivity Versus Depth (ARD) Plot in Multifrequency Depth Soundings", *Applied Physics Series Finland*, No. Ph157, pp. 2-34 (XP008038856) ISSN:0355-2721.

(Continued)

*Primary Examiner*—Curtis B Odom
(74) *Attorney, Agent, or Firm*—ExxonMobil Upstream Research Co. Law Department

(57) ABSTRACT

Waveforms for controlled source electromagnetic surveying. The waveforms have frequency spectra that include three or more frequencies spaced at substantially equal intervals on a logarithmic frequency scale and spanning a bandwidth of about one decade or more, at least three of which frequencies have approximately equal corresponding amplitudes.

24 Claims, 8 Drawing Sheets

U.S. PATENT DOCUMENTS 6,876,725 B2 * 4/2005 Rashid-Farrokhi et al. . 379/1.04

OTHER PUBLICATIONS

Chave, A. D. et al. (1988) "Electromagnetic Methods in Applied Geophysics—Chapter 12: Electrical Exploration Method for the Seafloor" (ed. M.N. Nambighian), *Society of Exploration Geophysicists*, v. 2, pp. 931-966.

Cherkaeva, E. et al. (1997) "On Optimal Design of Transient Electromagnetic Waveforms," *SEG Annual Meeting Extended Abstracts*, pp. 438-441.

Constable, S. et al. (1996) "Marine Controlled-Source Electromagnetic Sounding 2. The Pegausu Experiment," *Journal of Geophysical Research*, v. 101.B3, pp. 5519-5530.

Duncan, P. M. et al. (1980) "The Development and Applications of a Wide Band Electromagnetic Sounding System Using a Pseudo-Noise Source," *Geophysics* v. 45, pp. 1276-1296.

Eidesmo, T. et al. (2002) "Sea Bed Logging (SBL), a New Method for Remote and Direct Identification of Hydrocarbon Filled Layers in Deepwater Areas", *First Break*, v. 20.3, pp. 144-152 (XP002305545).

Ellingsrud, S. et al. (2002) "Remote Sensing of Hydrocarbon Layers by Seabed Logging (SBL): Results From a Cruise Offshore Angola," *The Leading Edge*, pp. 972-982.

Helwig, S. L. et al. (1999) "The VIBR OTEM Method," *SEG Annual Meeting Extended Abstracts*, pp. 283-285.

MacGregor, L. M. (1997) "Electromagnetic investigation of the Reykjanes Ridge near 58° North", Ph.D. Dissertation, Cambridge, pp. 84-86.

MacGregor, L. et al. (2001) "Electrical Resistivity Structure of the Valu Fa Ridge, Lau Basin, From Marine Controlled-Source Electromagnetic Sounding," *Geophy. J. Int.*, v. 146, pp. 217-236.

Spies, B. R. (1989) "Depth of Investigation in Electromagnetic Sounding Methods," *Geophysics*, v. 54, pp. 872-888.

Stratton, J. A. (1941) *Electromagnetic Theory*, MacGraw-Hill.

EP Standard Search Report (2004) 1 pages.

PCT International Search Report (2006) 9 pages.

* cited by examiner

LOGARITHMIC SPECTRUM TRANSMITTER WAVEFORM FOR CONTROLLED-SOURCE ELECTROMAGNETIC SURVEYING

This application is the National Stage of International Application No. PCT/US2005/013250, filed 20 Apr. 2005, which claims the benefit of U.S. Provisional Patent Application No. 60/572,694, filed 20 May, 2004.

FIELD OF THE INVENTION

This invention relates generally to the field of geophysical prospecting and, more particularly, to controlled source electromagnetic ("CSEM") surveys of subsurface formations. Specifically, the invention is an improved source waveform for generating CSEM fields.

BACKGROUND OF THE INVENTION

Controlled-source electromagnetic geophysical surveys use man-made sources to generate electromagnetic fields to excite the earth, and deploy receiver instruments in the earth's surface, on the seafloor, in the air, or inside boreholes to measure the resulting electric and magnetic fields, i.e., the earth's response to the source excitation. FIG. 1 illustrates the basic elements of an offshore CSEM survey. A vessel tows a submerged CSEM transmitter 11 over an area of subseafloor 13. The electric and magnetic fields measured by receivers 12 are then analyzed to determine the electrical resistivity of the earth structures beneath the surface or seafloor. This technology has been applied for onshore mineral exploration, oceanic tectonic studies, and offshore petroleum and mineral resource exploration. See A. D. Chave, S. Constable, and R. N. Edwards, in *Electromagnetic Methods in Applied Geophysics* (ed. M. N. Nambighian), Vol. 2, 931-966, Society of Exploration Geophysicists; L. MacGregor, M. Sinha, and S. Constable, *Geophy. J. Int.* 146, 217-236 (2001); S. Ellingsrud, T. Eidesmo, S. Johansen, M. C. Sinha, L. M. MacGregor, and S. Constable, *The Leading Edge,* 972-982 (2002); T. Eidesmo, S. Ellingsrud, L. M. MacGregor, S. Constable, M. C. Sinha, S. Johansen, F. N. Kong, and H. Westerdahl, *First Break* 20.3, 144-152 (2002).

Electromagnetic (EM) fields are generated by the transmitter injecting currents of a chosen low-frequency periodic waveform into the earth or seawater/seafloor. For inland and airborne CSEM surveys, measurements are usually made in the frequency range of 0.1 Hz to 50 kHz. Because of the low resistivity of the seafloor, offshore CSEM surveys are usually operated in a low frequency range (0.01 Hz to 100 Hz) to achieve sufficient exploration depth. The shape of the transmitted waveform determines its frequency spectrum. In other words, the transmitter waveform controls the frequency content, distribution and relative amplitudes of the component frequencies. This follows from Fourier analysis in which any function can be expressed as a series of sine or cosine functions of different frequencies. The less the function resembles a sinusoid, the more terms, and hence the more frequencies, that are needed in the Fourier expansion to give a good approximation of the function. The lower frequencies penetrate deeper beneath the earth's surface than the higher frequencies. In current surveys, the transmitter is flown above the earth's surface by an aircraft, or towed by a vessel only once along each survey line, due to the high cost of operating the source aircraft or vessel. Because the earth contains electrical structures at all depths, the use of multiple source frequencies at uniformly high power is highly desirable so that a range of depth can be probed using only one source tow.

Therefore, in order to acquire data efficiently and satisfy survey objectives as much as possible, it is desirable that the transmitter waveform have certain features. Its frequency spectrum should have multiple frequencies spread out over a frequency range (bandwidth) large enough to probe the depth range of interest. The energy transmitted at each such frequency should be as equal as possible or practical.

A variety of waveforms are available for use. The simplest one is a sinusoidal wave, but this contains only one frequency. The square wave is a simple and currently widely-used waveform, especially the symmetric square wave shown in FIG. 2A which has the same time duration for positive and negative polarities. This simple waveform has been used in CSEM work because it is easy to generate from a technological standpoint and it provides a useful range of frequencies; see L. M. MacGregor, *Electromagnetic investigation of the Reykjanes Ridge near 58° North*, Ph.D. Dissertation, Cambridge, 84-86 (1997). The symmetric square wave has only odd harmonics in its spectrum, and the harmonic amplitudes decrease quickly with increasing frequencies as shown in FIG. 2B. With the limitation of fixed transmitter power, it is very difficult to collect high signal-to-noise data for high harmonics unless the data are summed for a very large number of cycles. The abscissa values for FIG. 2A are normalized such that the period of the waveform is unity, and the ordinate values are normalized to have unit amplitude. The frequency values of the spectrum shown in FIG. 2B are also normalized by dividing by the fundamental frequency, i.e., the reciprocal of the repetition period of the waveform. The same type of normalization is used for all figures herein displaying waveforms and spectra.

A special waveform was designed by Constable and Cox to have the same and relatively large amplitude (power transmitted at that frequency) for the first and third harmonics (*J. Geophs. Res.* 101, 5519-5530 (1996)). This "Cox" waveform and its spectrum are shown in FIGS. 3A and 3B, respectively. Unfortunately the frequency band covered by these two harmonics is narrow [3:1 ratio], and amplitudes for higher harmonics decrease rapidly as the frequency increases.

Pseudo-random binary sequence ("PRBS") waveforms are well-known, and can provide more useful frequencies that span a wider frequency band. See, for example, P. M. Duncan et al., *Geophysics* 45, 1276-1296 (1980); and S. L. Helwig, et al., *SEG Annual Meeting Extended Abstracts,* 283-285 (1999). FIG. 4A shows a PRBS generated by a shift register of degree 4, and FIG. 4B shows its spectrum. Frequencies provided by a PRBS are spaced uniformly on a linear frequency scale.

A general numerical method has been taught (Cherkaeva, E. and Tripp, A. C., *SEG Annual Meeting Extended Abstracts,* 438-441 (1997)) for designing an optimal time-domain transmitter waveform for a stated subsurface electromagnetic imaging problem. Obtaining the Fourier-transformed frequencies of such an optimal waveform would be readily performed by practitioners in the art. However the method of Cherkaeva and Tripp requires a priori specification of the target properties, and depth, and in the example taught for probing a single buried layer, the waveform contains a single frequency whose amplitude varies sinusoidaly in time.

In a related but not directly applicable technology relative to the invention described herein, Hombostel and Thompson (U.S. Pat. No. 6,477,113) teach the use of a specialized electromagnetic source waveform for electroseismic geophysical applications, in which the spectrum of the source waveform is designed so as to have minimum correlation with frequencies outside the broadcast source spectrum.

SUMMARY OF THE INVENTION

In one embodiment, the invention is a periodic source waveform for electromagnetic surveys having a frequency spectrum comprising four or more frequencies spaced at substantially equal intervals on a logarithmic frequency scale and covering a bandwidth of about one decade or more, at least three of the frequencies having corresponding amplitudes A that are substantially equal and larger than the amplitudes of any other frequencies in the spectrum, and any remaining frequencies of said four or more having corresponding amplitudes at least 0.2 A.

In another embodiment, the invention is a periodic source waveform for electromagnetic surveys having period T and comprising segments of square pulses and zero-amplitude segments, said square pulses all being of substantially the same amplitude, and said segments having polarities and substantially the time durations and being sequentially connected as follows:

square pulse of a first polarity, duration 19/256T;
square pulse of the second polarity, duration 41/256 T;
zero amplitude, duration T/32;
square pulse of the second polarity, duration 41/256T;
square pulse of the first polarity, duration 39/256T;
zero amplitude, duration 19/128T;
square pulse of the first polarity, duration 13/256T;
zero amplitude, duration 19/128T; and
square pulse of the first polarity, duration 19/256T.

In a third embodiment, the invention is a periodic source waveform for electromagnetic surveys having period T and comprising segments of square pulses and zero-amplitude segments, said square pulses all being of substantially the same amplitude, and said segments having polarities and substantially the time durations and being sequentially connected as follows:

zero amplitude, duration 3/256T;
square pulse of a first polarity, duration 9/128T;
square pulse of the second polarity, duration 85/256T;
square pulse of the first polarity, duration 5/64T;
zero amplitude, duration 5/512T;
square pulse of the first polarity, duration 45/512T;
square pulse of the second polarity, duration 35/512T;
square pulse of the first polarity, duration 15/256T;
zero amplitude, duration 7/128T;
square pulse of the first polarity, duration 33/512T;
square pulse of the second polarity, duration 37/512T;
square pulse of the first polarity, duration 5/64T; and
zero amplitude, duration 7/512T.

Alternative embodiments of the invention may be generated by reversing the sequencing of segments stated above, and for either sequencing, by assigning the first polarity to be positive and the second polarity to be negative, or by reversing those polarities. These symmetries hold for any embodiment of the present invention. Also, any time shift of any waveform of the present invention results in an embodiment of the present invention.

In another embodiment, the invention is any method that generates any of the above-described waveforms.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DEATAILED DESCRIPTION OF THE PREFERRED EMBODIMENTS

The essence of the present invention is that a source waveform for CSEM surveying should preferably have a frequency spectrum in which desired frequencies having the larger associated amplitudes are spaced substantially uniformly (i.e., at roughly equal intervals) on a logarithmic scale and cover a useful bandwidth. It is well known that, for low-frequency EM fields, effective exploration depth increases with decreasing frequency and with decreasing conductivity of the medium, according to the skin effect phenomena (J. A. Stratton, Electromagnetic Theory, MacGraw-Hill (1941); B. R. Spies, *Geophysics* 54, 872-888 (1989)). Since most CSEM data are collected relatively far from the source so that near-field geometric effects are negligible, an electromagnetic field at a specific frequency decays exponentially with depth for depths greater than a few source dipole lengths. The present invention enables CSEM surveying to achieve a wider probing depth with multiple frequencies in one source tow, and to sample the subsurface at depth, more densely at shallow depths than deeper, which is consistent with the diffusive nature of low-frequency electromagnetic fields.

Figure 1:
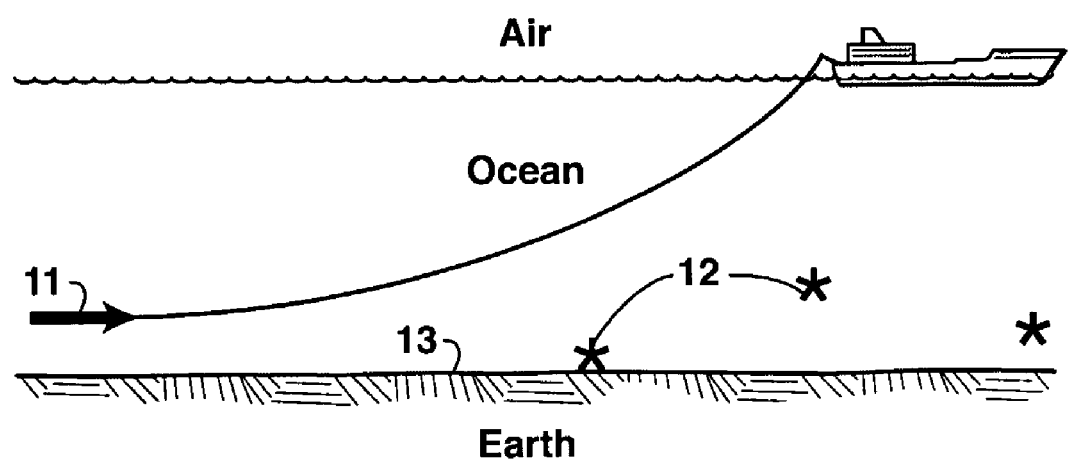
FIG. 1 is a schematic diagram illustrating offshore controlled source electromagnetic surveying using a horizontal electric dipole source.
Figure 2A:
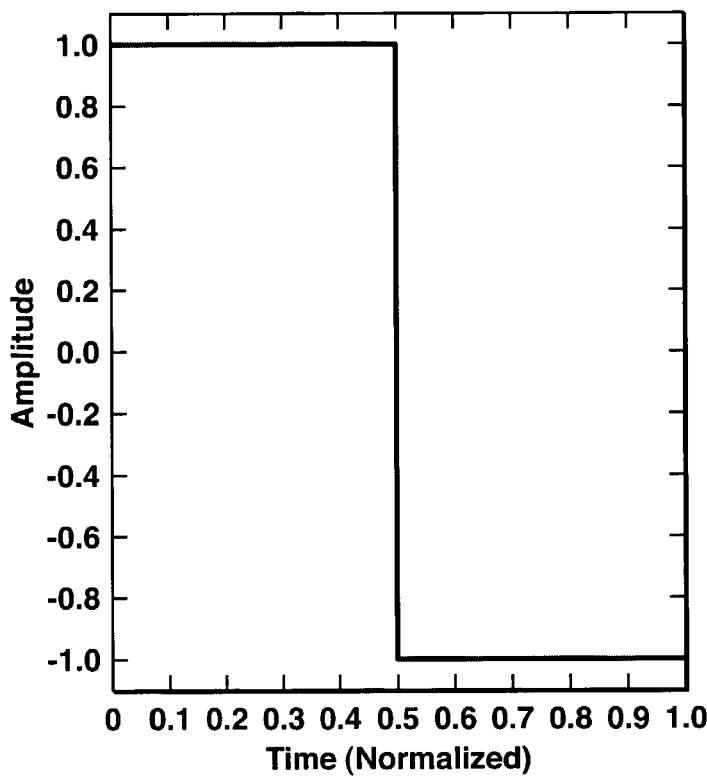
FIGS. 2A and 2B are graphs of a symmetric square wave and its frequency spectrum, respectively.
Figure 2B:
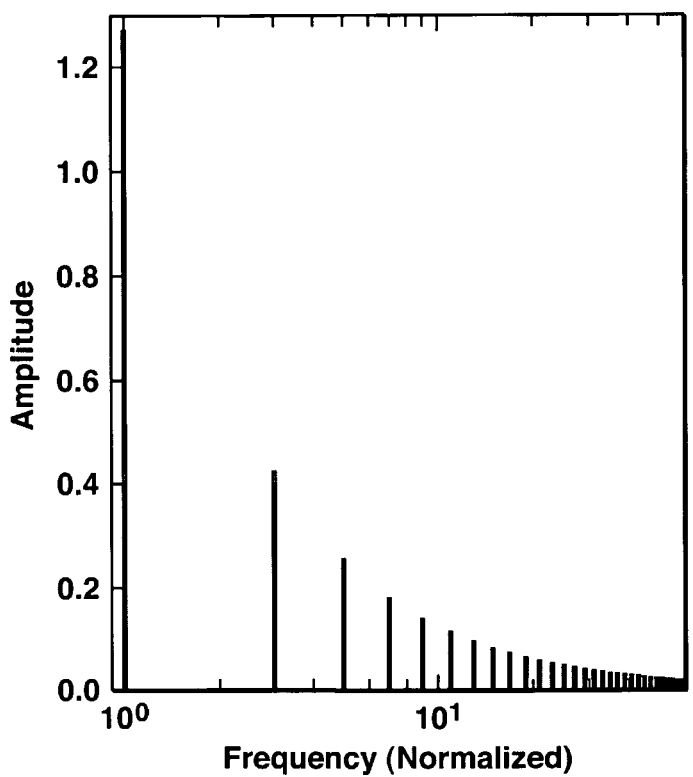
Figure 3A:
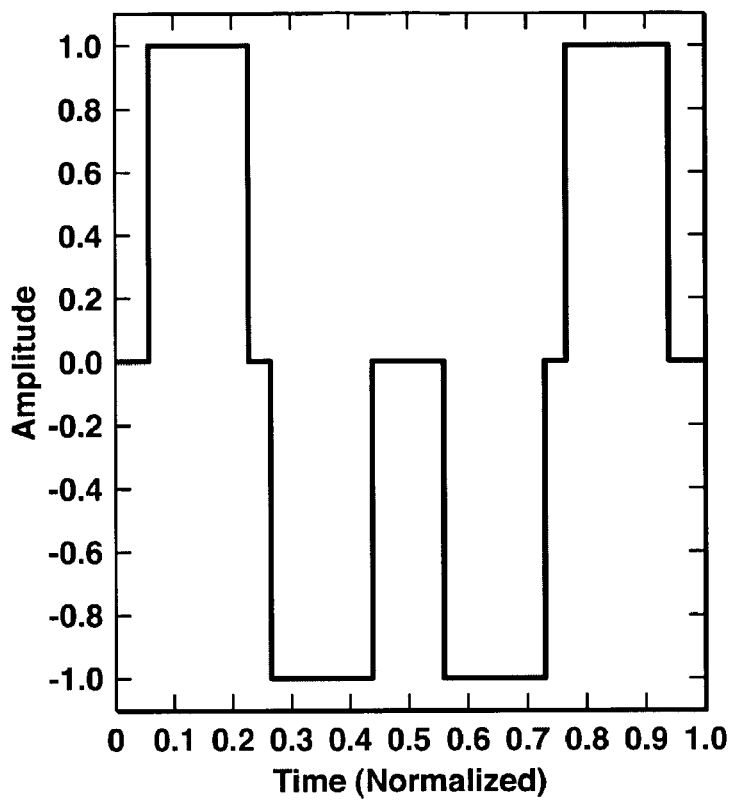
FIGS. 3A and 3B are graphs of a waveform designed for CSEM surveying by Cox and Constable, and the waveform's frequency spectrum, respectively.
Figure 3B:
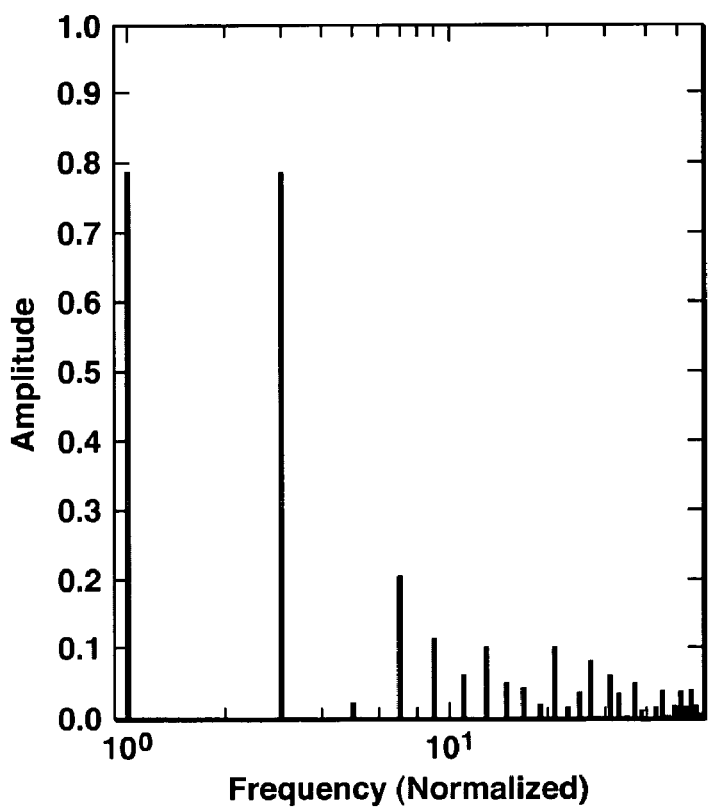
Figure 4A:
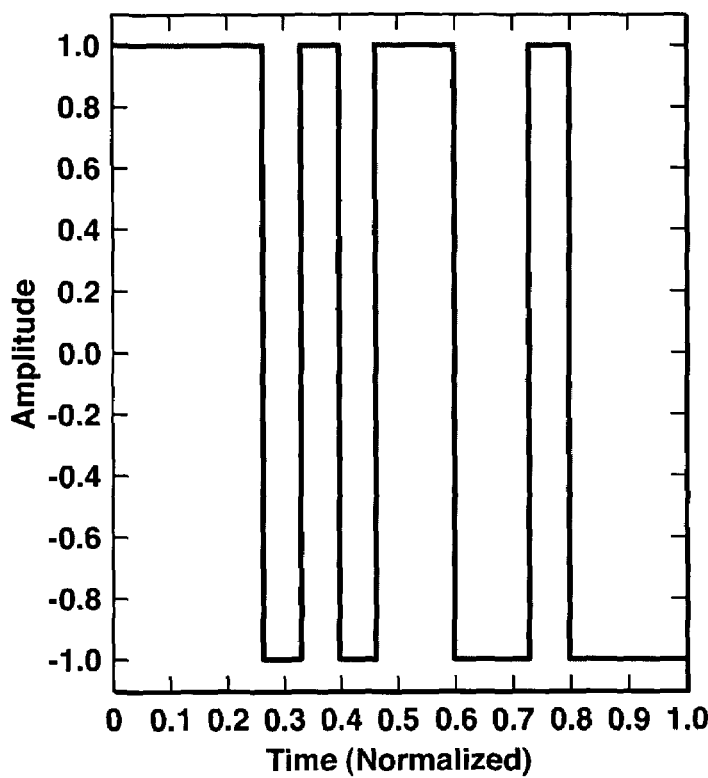
FIGS. 4A and 4B are graphs of a binary-coded waveform using a pseudo-random binary sequence of degree 4, and its frequency spectrum, respectively.
Figure 4B:
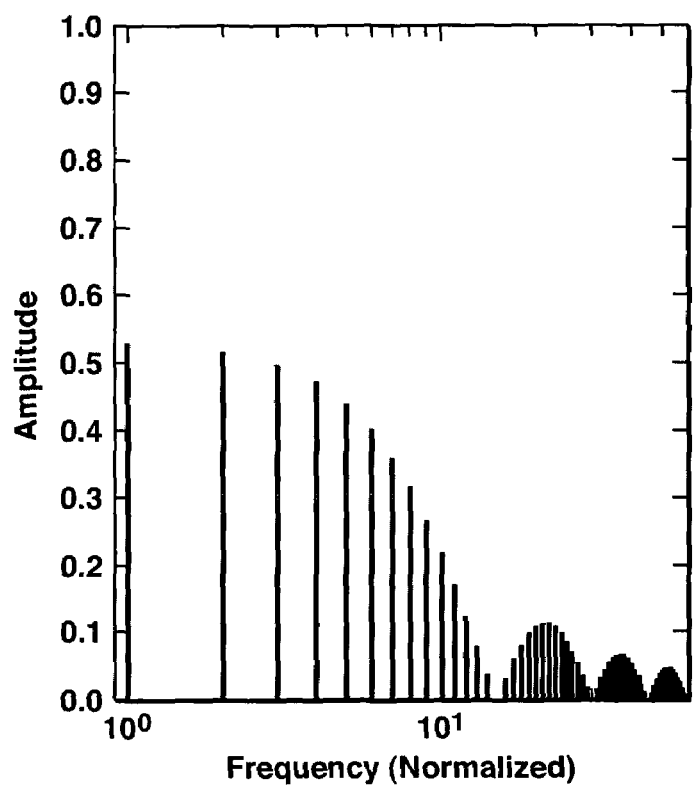
Figure 5A:
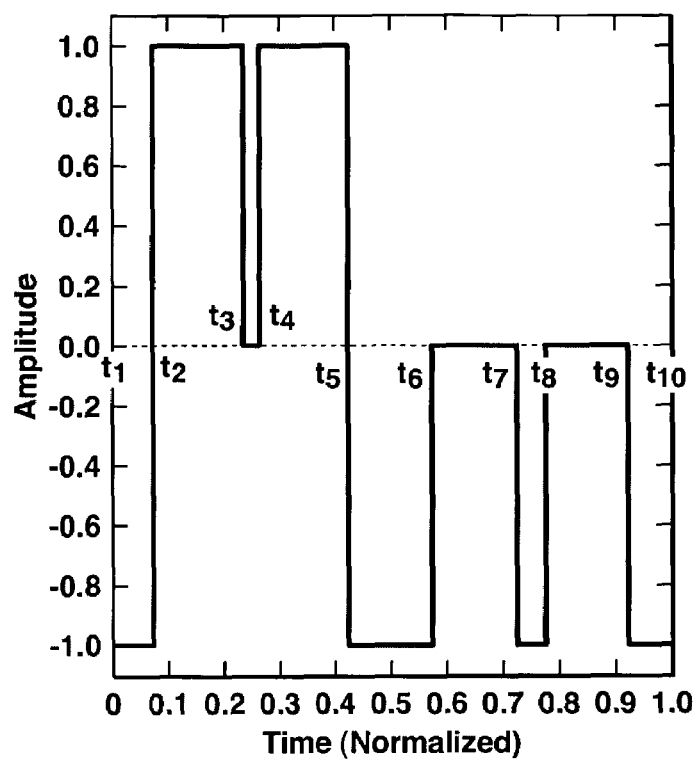
FIGS. 5A and 5B are graphs of the waveform in one specific embodiment of the present invention and its frequency spectrum, respectively.

One embodiment of the present invention is the waveform shown in FIG. 5A. The waveform has start time, zero-amplitude intersections with the time-axis, and end time at $t_1=0.0$, $t_2=19/256$, $t_3=15/64$, $t_4=17/64$, $t_5=109/256$, $t_6=37/64$, $t_7=93/128$, $t_8=199/256$, $t_9=237/256$, $t_{10}=1.0$, where $t_1, t_2, \ldots, t_{10}$ are normalized times expressed as fractions of the adjustable period (T) of the waveform. The waveform can be constructed according to Table 1.

TABLE 1

| Normalized Time | Normalized Amplitude |
| --- | --- |
| $t_1$-$t_2$ | −1.0 |
| $t_2$-$t_3$ | 1.0 |
| $t_3$-$t_4$ | 0.0 |
| $t_4$-$t_5$ | 1.0 |
| $t_5$-$t_6$ | −1.0 |
| $t_6$-$t_7$ | 0.0 |
| $t_7$-$t_8$ | −1.0 |
| $t_8$-$t_9$ | 0.0 |
| $t_9$-$t_{10}$ | −1.0 |

Figure 5B:
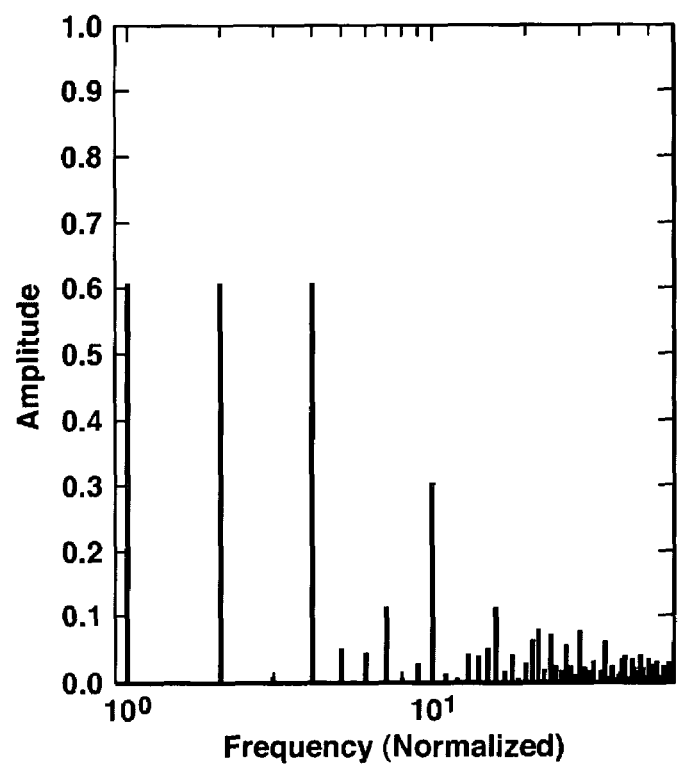

The spectrum of this waveform is shown in FIG. 5B. Table 2 lists the normalized frequencies and amplitudes for the largest five amplitudes. The invented waveform has 3 frequencies with almost exactly the same amplitude and with constant spacing on a logarithmic scale such as the scale of FIG. 5B. The frequencies for the largest five amplitudes are distributed almost uniformly on the logarithmic scale, and cover more than one decade of the frequency band.

TABLE 2

| Norm. Freq. | 1 | 2 | 4 | 10 | 16 |
| --- | --- | --- | --- | --- | --- |
| Amplitude | 0.611 | 0.610 | 0.610 | 0.307 | 0.174 |

Figure 6A:
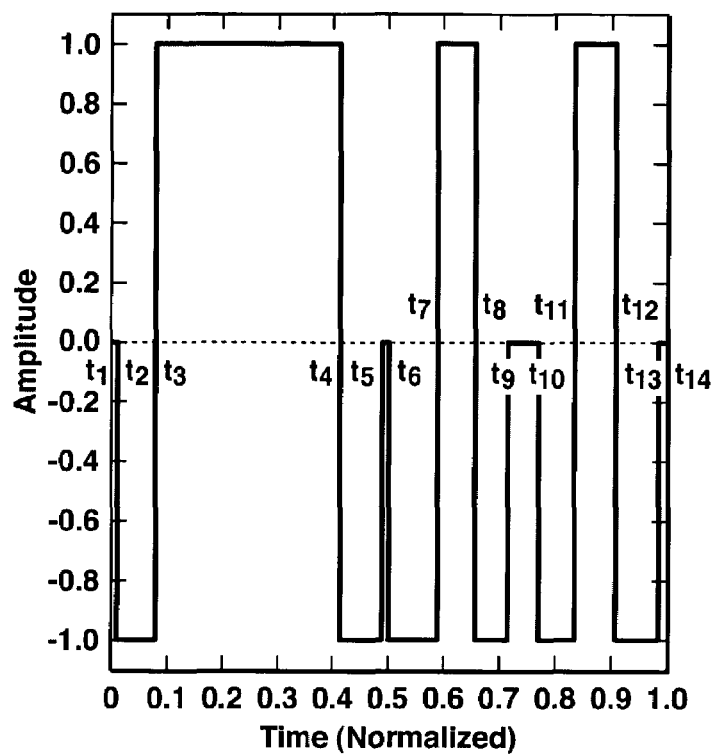
FIGS. 6A and 6B are graphs of the waveform in a different specific embodiment of the present invention and its frequency spectrum.

Another embodiment of the present invention is the waveform shown in FIG. 6A. This waveform has zero-amplitude intersections with the time-axis at $t_1$=0.0, $t_2$=3/256, $t_3$=21/256, $t_4$=53/128, $t_5$=63/128, $t_6$=257/512, $t_7$=151/256, $t_8$=337/512, $t_9$=367/512, $t_{10}$=395/512, $t_{11}$=107/128, $t_{12}$=465/512, $t_{13}$=505/512, $t_{14}$=1.0, where $t_1$, $t_2$, ..., $t_{14}$ are normalized times expressed as fractions of the adjustable period (T) of the waveform. The waveform can be constructed according to Table 3.

TABLE 3

| Normalized Time | Normalized Amplitude |
| --- | --- |
| $t_1$-$t_2$ | 0.0 |
| $t_2$-$t_3$ | −1.0 |
| $t_3$-$t_4$ | 1.0 |
| $t_4$-$t_5$ | −1.0 |
| $t_5$-$t_6$ | 0.0 |
| $t_6$-$t_7$ | −1.0 |
| $t_7$-$t_8$ | 1.0 |
| $t_8$-$t_9$ | −1.0 |
| $t_9$-$t_{10}$ | 0.0 |
| $t_{10}$-$t_{11}$ | −1.0 |
| $t_{11}$-$t_{12}$ | 1.0 |
| $t_{12}$-$t_{13}$ | −1.0 |
| $t_{13}$-$t_{14}$ | 0.0 |

Figure 6B:
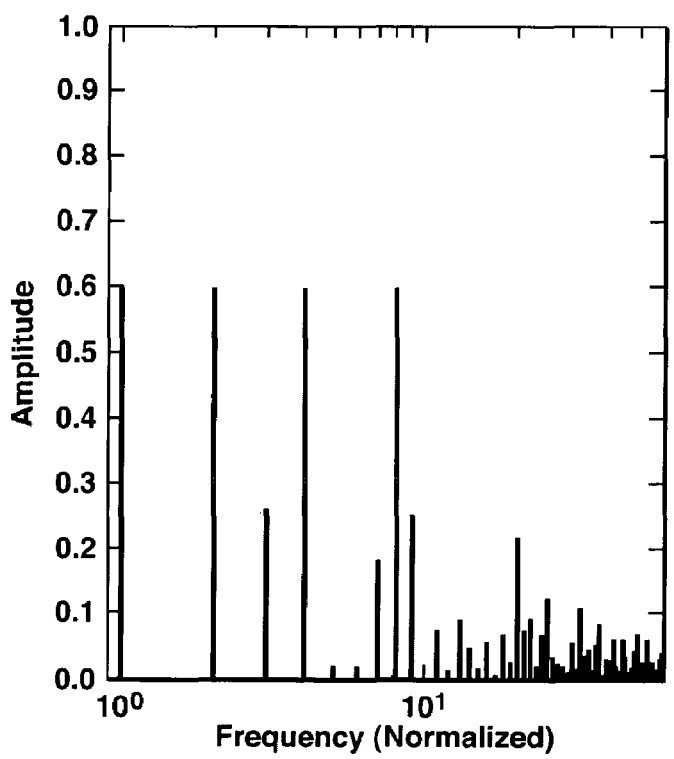

The spectrum of this waveform is shown in FIG. 6B. Table 4 lists the normalized frequencies and amplitudes for the largest four amplitudes. The invented waveform has four frequencies with almost exactly the same amplitude and with constant spacing on a logarithmic scale. The bandwidth covered by the four frequencies is substantially one decade.

TABLE 4

| Norm. Freq. | 1 | 2 | 4 | 8 |
| --- | --- | --- | --- | --- |
| Amplitude | 0.596 | 0.598 | 0.595 | 0.595 |

These invented logarithmic spectrum waveforms thus satisfy the previously stated criteria for a CSEM waveform as well as the additional requirements of the present invention, e.g., substantially uniform spacing on a logarithmic scale. Use of such waveforms allows a wider depth range to be explored with one source passage by means of a better frequency distribution.

Certain symmetrical variations of the waveforms of FIGS. 5A and 6A also produce the frequency spectra of FIGS. 5B and 6B, respectively, and thus are equally preferred embodiments of the present invention. For example, reflecting either waveform through the time axis, i.e., reversing polarities, produces such an alternative embodiment. Similarly for reflection of either waveform through the t=T/2 line. All such variants of the waveforms of FIG. 5A or FIG. 6A are equivalent embodiments of the present invention. Both waveforms also have the property of being invariant to translations along the time scale.

The time-axis intercepts of the invented waveform of FIG. 5A can be varied somewhat, perhaps up to ±5% or in that range, without substantially affecting the frequency spectrum. Similarly with the constancy of the amplitude, where variations of up to ±10% or in that range will not produce effects on the frequency spectrum that will be considered unacceptable by many users. Similar considerations also apply to the slope of the polarity reversals. In embodiments of the present invention in addition to the particular embodiments of FIGS. 5A and 6A, the waveform will preferably have at least three frequencies (in its Fourier decomposition) having substantially equal amplitudes (preferably ±20%, more preferably ±10%) and spaced at substantially equal (same preferred tolerances) intervals on a logarithmic frequency scale. Other frequencies in the spectrum will have lesser associated amplitudes. The at least three equal-amplitude frequencies will cover about one decade of bandwidth or more, or, if not, the spectrum will have one or more additional frequencies with amplitudes preferably at least 20%, and more preferably at least 30%, of that of the equal-amplitude frequencies, also spaced at the same substantially equal (on a log scale) frequency interval from each other and from the first three frequencies, such that all four or more such frequencies do cover a bandwidth of about one decade or more. As used herein, "about one decade" preferably means a ratio of highest to lowest frequency of at least 8:1. The user of the invention will be able to determine how much latitude in the above-recommended tolerances are acceptable for a particular application.

Figure 7A:
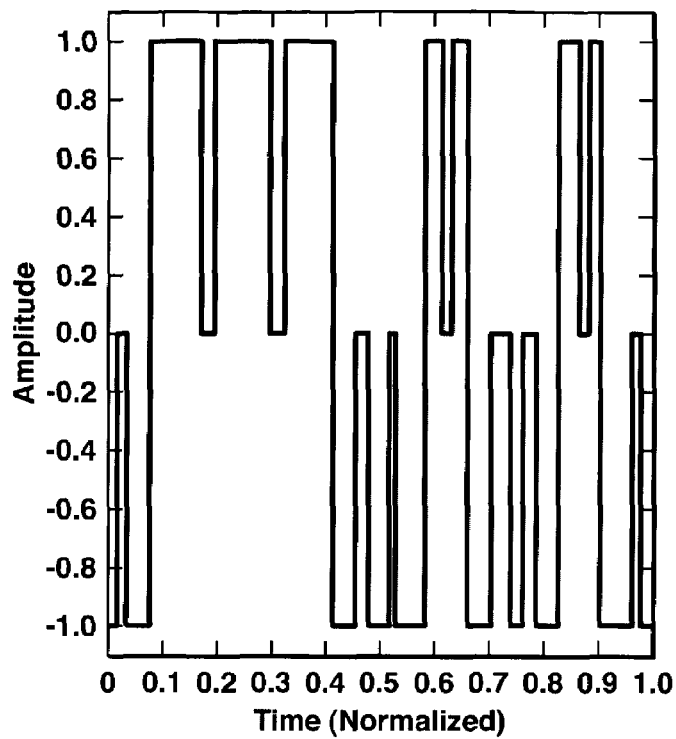
FIGS. 7A and 7B are graphs of the waveform in yet another specific embodiment of the present invention and its frequency spectrum.
Figure 7B:
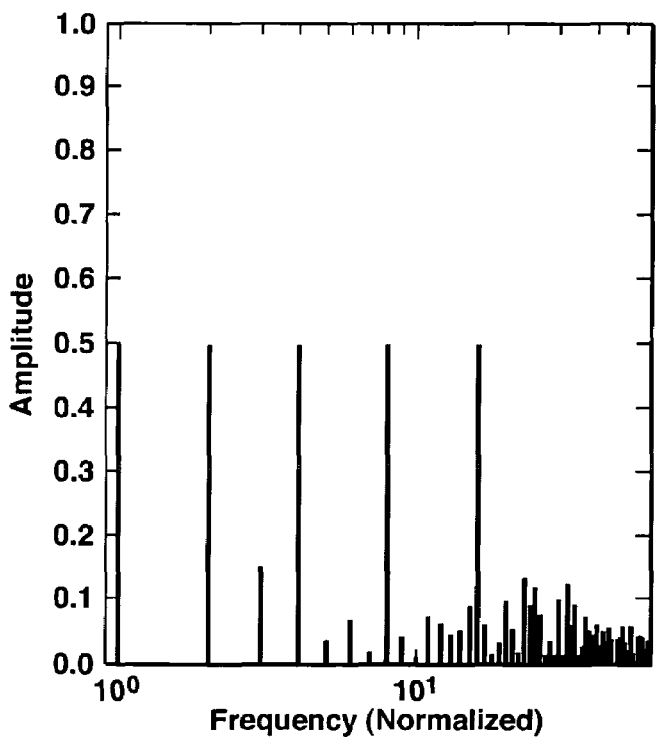

The skilled person in the art will be able to design many waveforms (besides the two specific embodiments of FIGS. 5A and 6A) that satisfy the preceding specifications. All such waveforms are included within the scope of the present invention. For example, a waveform with a frequency spectrum having five peaks spaced at exactly equal intervals on a log scale, and having nearly equal corresponding amplitudes is the waveform having the following start time, zero-amplitude times, and end time (expressed as fractions of the period): 0, 0.017578125, 0.037109375, 0.080078125, 0.171875, 0.197265625, 0.298828125, 0.32421875, 0.4140625, 0.458984375, 0.478515625, 0.521484375, 0.533203125, 0.583984375, 0.611328125, 0.6328125, 0.662109375, 0.705078125, 0.7421875, 0.755859375, 0.7890625, 0.83203125, 0.865234375, 0.888671875, 0.91015625, 0.962890625, 0.978515625, and 1, with (respectively) the following normalized amplitudes for the intervals thus defined: −1, 0, −1, 1, 0, 1, 0, 1, −1, 0, −1, 0, −1, 1, 0, 1, −1, 0, −1, 1, 0, 1, −1, 0, and −1. This waveform and its frequency spectrum are shown in FIGS. 7A and 7B. The skilled person in the art will develop his or her own approach to generating other waveforms with uniform logarithmic spectra. One approach is to partition the period T into N segments. Possible amplitudes for each segment are limited to −1, 0, or 1. Different combinations of amplitude and interval can then be checked one-by-one against the previously stated criteria. Alternatively, one might begin with an initial waveform having a certain number of zero-crossings, and then adjust the positions of the zero crossings holding amplitudes fixed and checking the frequency spectrum for each case. In any approach, experimentation will play a large part, but accrued experience will increase the incidence of success. The experimenter will discover that there tends to be a trade-off between amplitude and the number of nearly-equal-amplitude frequencies. The preferred waveform will depend on factors such as survey objectives and equipment capabilities.

Figure 8:
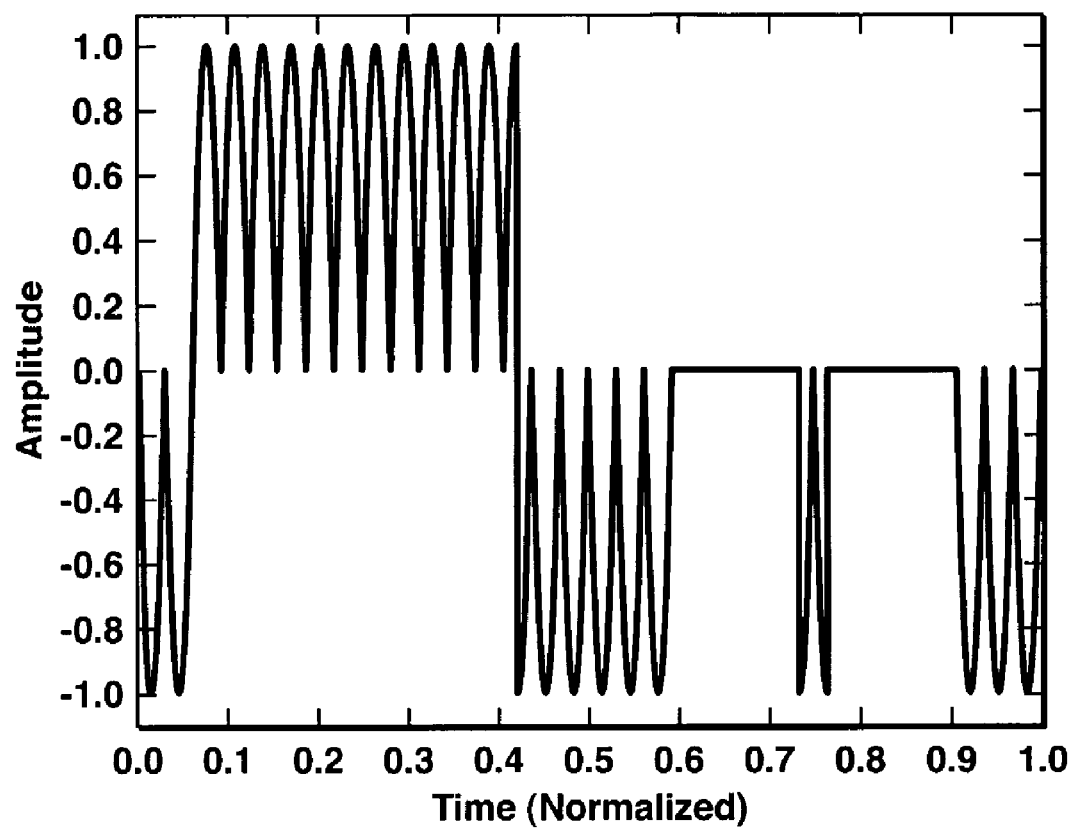
FIG. 8 is a graph of the waveform of the embodiment of FIG. 5A when generated using rectified sinusoids, i.e., quasi-DC voltage or current from a transmitting device.

The waveforms of the present invention can be synthesized by rectifying sinusoids and switching at the given times to make a rectified AC version of the invented waveforms, as illustrated in FIG. 8 for the case of the waveform of FIG. 5A. Alternatively, the waveform may be generated by switching a true direct current (DC) electromotive source such as a battery. A person skilled in the art will readily understand the various practical ways of generating the invented waveforms, all of which are considered embodiments of the present inventive method. Since the lowest frequency (having a large associated amplitude) in a waveform's frequency spectrum is typically the frequency of the periodic waveform itself, i.e., 1/T, one can control where the usable source bandwidth will fall on the frequency scale by adjusting the period of the waveform.

The foregoing description is directed to particular embodiments of the present invention for the purpose of illustrating it. It will be apparent, however, to one skilled in the art, that many modifications and variations to the embodiments described herein are possible. For example, use of a waveform of the present invention modified for time-domain data processing in an airborne application, or on the earth's surface, would be valuable for simultaneous penetration to several depths of interest. All such modifications and variations are intended to be within the scope of the present invention, as defined by the appended claims.

We claim:

1. A transmitter comprising a generator for generating an electric current with a periodic source waveform for electromagnetic surveys, said waveform having a frequency spectrum comprising four or more frequencies spaced at substantially equal intervals on a logarithmic frequency scale and covering a bandwidth of about one decade or more, at least three of the frequencies having corresponding amplitudes A that are substantially equal and larger than the amplitudes of any other frequencies in the spectrum, and any remaining frequencies of said four or more having corresponding amplitudes at least 0.2A.

2. The transmitter of claim 1, wherein the waveform has period T and comprises segments of square pulses and zero-amplitude segments, said square pulses all being of substantially the same amplitude, and said segments having polarities and substantially the time durations and being sequentially connected as follows:
   square pulse of a first polarity, duration 19/256T;
   square pulse of the second polarity, duration 41/256T;
   zero amplitude, duration T/32;
   square pulse of the second polarity, duration 41/256T;
   square pulse of the first polarity, duration 39/256T;
   zero amplitude, duration 19/128T;
   square pulse of the first polarity, duration 13/256T;
   zero amplitude, duration 19/128T; and
   square pulse of the first polarity, duration 19/256T.

3. The transmitter of claim 2, wherein the first polarity is negative and the second polarity is positive.

4. The transmitter of claim 3, wherein the sequential connection is forward in time.

5. The transmitter of claim 3, wherein the sequential connection is backward in time.

6. The transmitter of claim 2, wherein the first polarity is positive and the second polarity is negative.

7. The transmitter of claim 6, wherein the sequential connection is forward in time.

8. The transmitter of claim 6, wherein the sequential connection is backward in time.

9. The transmitter of claim 1, wherein the waveform has period T and comprises segments of square pulses and zero-amplitude segments, said square pulses all being of substantially the same amplitude, and said segments having polarities and substantially the time durations and being sequentially connected as follows:
   zero amplitude, duration 3/256T;
   square pulse of a first polarity, duration 19/128T;
   square pulse of the second polarity, duration 85/256T;
   square pulse of the first polarity, duration 5/64T;
   zero amplitude, duration 5/512T;
   square pulse of the first polarity, duration 45/512T;
   square pulse of the second polarity, duration 35/512T;
   square pulse of the first polarity, duration 15/256T;
   zero amplitude, duration 7/128T;
   square pulse of the first polarity, duration 33/512T;
   square pulse of the second polarity, duration 37/512T;
   square pulse of the first polarity, duration 5/64T; and
   zero amplitude, duration 7/512T.

10. The transmitter of claim 9, wherein the first polarity is negative and the second polarity is positive.

11. The transmitter of claim 10, wherein the sequential connection is forward in time.

12. The transmitter of claim 10, wherein the sequential connection is backward in time.

13. The transmitter of claim 9, wherein the first polarity is positive and the second polarity is negative.

14. The transmitter of claim 13, wherein the sequential connection is forward in time.

15. The transmitter of claim 13, wherein the sequential connection is backward in time.

16. A method for performing an electromagnetic survey of a subsurface region to explore for petroleum or another mineral resource, comprising:
   (a) designing a periodic source waveform involving switching a substantially constant voltage DC power source and changing the source's output polarity according to a pre-selected sequence, said sequence being designed to provide a frequency spectrum comprising three or more frequencies spaced at substantially equal intervals on a logarithmic frequency scale and covering a bandwidth of about one decade or more, at least three of the frequencies having corresponding amplitudes A that are substantially equal and larger than the amplitudes of any other frequencies in the spectrum, and any remaining frequencies of said three or more having corresponding amplitudes at least 0.2A;
   (b) obtaining data resulting from transmitting electric current having the periodic source waveform into the subsurface region and measuring and recording an electromagnetic response using one or more receivers; and
   (c) analyzing the data to determine electrical resistivity structure in the subsurface region, and using the resistivity structure to predict potential for an accumulation of petroleum or another mineral resource.

17. The method of claim 16, wherein the source waveform has a period T and the switching and polarity change sequence is the following sequence, performed in either the order stated or in the reverse order:
   a) switching the source on with a first output polarity for 9/128T;
   b) reversing the source to a second output polarity for 21/128T;
   c) switching the source off for 7/256T;
   d) switching the source on with the second polarity for 43/256T;
   e) reversing the source to the first polarity for 37/256T;
   f) switching the source off for 39/256T;
   g) switching the source on with the first polarity for 3/64T;
   h) switching the source off for 39/256T; and
   i) switching the source on with the first polarity for 19/256T.

18. The method of claim 17, wherein the first polarity is negative and the second polarity is positive.

19. The method of claim 17, wherein the first polarity is positive and the second polarity is negative.

20. The method of claim 16, wherein the source waveform has a period T and the switching and polarity change sequence is the following sequence, performed in either the order stated or in the reverse order:
   (a) switching the source off for 3/256T;
   (b) switching the source on with a first output polarity for 9/128T;
   (c) reversing the polarity to a second output polarity for 85/256T;
   (d) reversing the source to the first polarity for 5/64T;
   (e) switching the source off for 5/512T;
   (f) switching the source on with the first polarity for 45/512T;
   (g) reversing the source to the second polarity for 35/512T;
   (h) reversing the source to the first polarity for 15/256T;
   (i) switching the source off for 7/128T;
   (j) switching the source on with the first polarity for 33/512T;
   (k) reversing the source to the second polarity for 37/512T;
   (l) reversing the source to the first polarity for 5/64T; and
   (m) switching the source off for 7/512T.

21. The method of claim 20, wherein the first polarity is negative and the second polarity is positive.

22. The method of claim 20, wherein the first polarity is positive and the second polarity is negative.

23. The method of claim 16, wherein the DC power source is a battery or similar electromotive source.

24. The method of claim 16, wherein the DC power source synthesizes a DC output by rectifying an AC voltage source.

* * * * *

UNITED STATES PATENT AND TRADEMARK OFFICE
CERTIFICATE OF CORRECTION

PATENT NO. : 7,539,279 B2
APPLICATION NO. : 11/587420
DATED : May 26, 2009
INVENTOR(S) : Xinyou Lu and Leonard J. Srnka It is certified that error appears in the above-identified patent and that said Letters Patent is hereby corrected as shown below:

Column 7, line 55, cancel the text beginning with "2. The transmitter of claim 1," to and ending "square pulse of the first polarity, duration 19/256T" in column 8, line 2, and insert the following claim:

-- 2.  The transmitter of claim 1, wherein the waveform has period T and comprises segments of square pulses and zero-amplitude segments, said square pulses all being of substantially the same amplitude, and said segments having polarities and substantially the time durations and being sequentially connected as follows:
  square pulse of a first polarity, duration (19/256)T;
  square pulse of the second polarity, duration (41/256)T;
  zero amplitude, duration T/32;
  square pulse of the second polarity, duration (41/256)T;
  square pulse of the first polarity, duration (39/256)T;
  zero amplitude, duration (19/128)T;
  square pulse of a first polarity, duration (13/256)T;
  zero amplitude, duration (19/128)T; and
  square pulse of the first polarity, duration (19/256)T. --

Column 8, line 15, cancel the text beginning with "9. The transmitter of claim 1," to and ending "zero amplitude, duration 7/512T," in column 8, line 33, and insert the following claim:

-- 9.  The transmitter of claim 1, wherein the waveform has period T and comprises segments of square pulses and zero-amplitude segments, said square pulses all being of substantially the same amplitude, and said segments having polarities and substantially the time durations and being sequentially connected as follows:
  zero amplitude, duration (3/256)T;
  square pulse of a first polarity, duration (9/128)T;
  square pulse of the second polarity, duration (85/256)T;
  square pulse of the first polarity, duration (5/64)T;

Signed and Sealed this
Eleventh Day of October, 2011

David J. Kappos
*Director of the United States Patent and Trademark Office* zero amplitude, duration (5/512)T;
square pulse of the first polarity, duration (45/512)T;
square pulse of the second polarity, duration (35/512)T;
square pulse of the first polarity, duration (15/256)T;
zero amplitude, duration (7/128)T;
square pulse of the first polarity, duration (33/512)T;
square pulse of the second polarity, duration (37/512)T;
square pulse of the first polarity, duration (5/64)T; and
zero amplitude, duration (7/512)T. --

In the claims:

Column 9, line 3, cancel the text beginning with "17. The method of claim 16," to and ending "19/256T" in column 9, line 19, and insert the following claim:

-- 17. The method of claim 16, wherein the source waveform has a period T and the switching and polarity change sequence is the following sequence, performed in either the order stated or in the reverse order:
- a) switching the source on with a first output polarity for (19/256)T;
- b) reversing the source to a second output polarity for (41/256)T;
- c) switching the source off for (1/32)T;
- d) switching the source on with the second polarity for (41/256)T;
- e) reversing the source to the first polarity for (39/256)T;
- f) switching the source off for (19/128)T;
- g) switching the source on with the first polarity for (13/256)T;
- h) switching the source off for (19/128)T; and
- i) switching the source on with the first polarity for (19/256)T. --

Column 9, line 24, cancel the text beginning with "20. The method of claim 16," to and ending "(m) switching the source off for 7/512T" in column 10, line 17, and insert the following claim:

-- 20. The method of claim 16, wherein the source waveform has a period T and the switching and polarity change sequence is the following sequence, performed in either the order stated or in the reverse order:
- a) switching the source off for (3/256)T;
- b) switching the source on with a first output polarity for (9/128)T;
- c) reversing the polarity to a second output polarity for (85/256)T;
- d) reversing the source to the first polarity for (5/64)T;
- e) switching the source off for (5/512)T;
- f) switching the source on with the first polarity for (45/512)T;
- g) reversing the source to the second polarity for (35/512)T;
- h) reversing the source to the first polarity for (15/256)T;
- i) switching the source off for (7/128)T;

CERTIFICATE OF CORRECTION (continued)

U.S. Pat. No. 7,539,279 B2 j) switching the source on with the first polarity for (33/512)T;
k) reversing the source to the second polarity for (37/512)T;
l) reversing the source to the first priority for (5/64)T; and
m) switching the source off for (7/512)T. --